US009607580B2

(12) United States Patent
Kim et al.

(10) Patent No.: US 9,607,580 B2
(45) Date of Patent: Mar. 28, 2017

(54) DRIVING METHOD TO IMPROVE STEREOSCOPIC IMAGE DISPLAY VISIBILITY

(75) Inventors: Jeongki Kim, Paju-si (KR); Joonyoung Park, Paju-si (KR); Seungho Baek, Paju-si (KR); Jooah Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 327 days.

(21) Appl. No.: 13/601,145

(22) Filed: Aug. 31, 2012

(65) Prior Publication Data
US 2013/0235019 A1 Sep. 12, 2013

(30) Foreign Application Priority Data
Sep. 2, 2011 (KR) ........................ 10-2011-0089076

(51) Int. Cl.
*G09G 5/14* (2006.01)
*H04N 13/04* (2006.01)

(52) U.S. Cl.
CPC ........... *G09G 5/14* (2013.01); *H04N 13/0434* (2013.01); *H04N 13/0452* (2013.01); *H04N 13/0497* (2013.01)

(58) Field of Classification Search
CPC .. G09G 2330/00–2330/12; G09G 5/14; G09G 3/36; H04N 13/00; H04N 13/0429; H04N 13/0434; H04N 13/04445; H04N 13/0447; H04N 13/045
USPC ................................................ 345/204–215
See application file for complete search history.

(56) References Cited

U.S. PATENT DOCUMENTS

| 2007/0146260 A1* | 6/2007 | Kang ................... G09G 3/3655 345/87 |
| 2007/0171168 A1* | 7/2007 | Park ..................... G09G 3/3677 345/92 |
| 2009/0021496 A1* | 1/2009 | Silzars .......................... 345/204 |
| 2010/0026921 A1* | 2/2010 | Tsubata ................ G09G 3/3648 349/37 |
| 2012/0050261 A1* | 3/2012 | Feng .................. G02B 27/2242 345/419 |

(Continued)

FOREIGN PATENT DOCUMENTS

| CN | 101471032 A | 7/2009 |
| CN | 102045034 A | 5/2011 |
| CN | 102081911 A | 6/2011 |

OTHER PUBLICATIONS

Office Action issued in Chinese Patent Application No. 201210316739.4, mailed Jun. 25, 2014, 17 pages.

*Primary Examiner* — Lisa Landis
(74) *Attorney, Agent, or Firm* — Brinks Gilson & Lione

(57) ABSTRACT

The stereoscopic image display includes a control voltage generator and a control voltage compensator. The control voltage generator generates a discharge control voltage to be applied to a discharge control line at a slight-on level, which is higher than a gate low voltage and is lower than a gate high voltage, and periodically reduces the discharge control voltage to a level of the gate low voltage in the 3D mode. The control voltage compensator receives the discharge control voltage from the control voltage generator, amplifies a feedback discharge control voltage supplied from a first part of a display panel based on the received discharge control voltage, and applies the amplified feedback discharge control voltage, as a compensated discharge control voltage, to a second part opposite the first part of the display panel.

9 Claims, 11 Drawing Sheets

(56) References Cited

U.S. PATENT DOCUMENTS

2012/0120128 A1* 5/2012 Oh .................... H04N 13/0438
 345/691
2012/0262430 A1* 10/2012 Ho ..................... G02F 1/13624
 345/204

* cited by examiner

DRIVING METHOD TO IMPROVE STEREOSCOPIC IMAGE DISPLAY VISIBILITY

CROSS-REFERENCE TO RELATED APPLICATION

This application claims the benefit of Korean Patent Application No. 10-2011-0089076 filed on Sep. 2, 2011, the content of which is incorporated herein by reference in its entirety.

FIELD

The present disclosure relates to a stereoscopic image display capable of selectively implementing a two-dimensional plane image (hereinafter referred to as "2D image") and a three-dimensional stereoscopic image (hereinafter referred to as "3D image").

BACKGROUND

A stereoscopic image display capable of selectively implementing a 2D image and a 3D image has been developed and has been put on the market due to the development of various contents and circuit technology. A method for implementing the 3D image of the stereoscopic image display is mainly classified into a stereoscopic technique and an auto-stereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images each having a different polarization direction are displayed on a display panel, and a stereoscopic image is implemented using polarized glasses or liquid crystal (LC) shutter glasses.

A glasses-type stereoscopic image display having LC shutter glasses alternately displays a left eye image and a right eye image on a display element every one frame and opens and closes a left eye shutter and a right eye shutter of LC shutter glasses in synchronization with a display timing, thereby implementing the 3D image. In the glasses-type stereoscopic image display having the LC shutter glasses, because the LC shutter glasses have a short data-on time, a luminance of the 3D image is low. Further, a 3D crosstalk is extremely generated because of the synchronization between the display element and the LC shutter glasses and the On/Off conversion response characteristic.

In a polarized-glasses-type stereoscopic image display, a polarization separation device, such as a patterned retarder, has to be attached to a display panel. The patterned retarder separates polarized light of a left eye image and a right eye image displayed on the display panel. A viewer wears polarized glasses when viewing a stereoscopic image on the polarized-glasses-type stereoscopic image display. Hence, the viewer sees polarized light of the left eye image through a left eye filter of the polarized glasses and polarized light of the right eye image through a right eye filter of the polarized glasses, thereby giving a stereoscopic feeling.

The display panel of the existing polarized-glasses-type stereoscopic image display may use a liquid crystal display panel. A parallax is generated between a pixel array of the liquid crystal display panel and the patterned retarder due to a thickness of an upper glass substrate of the liquid crystal display panel and a thickness of an upper polarizing plate, and thus leads to a poor vertical viewing angle. When the viewer views a stereoscopic image displayed on the polarized-glasses-type stereoscopic image display at a vertical viewing angle higher or lower than the front of the liquid crystal display panel, he or she may feel the 3D crosstalk, where the left eye image and the right eye image overlap each other, when viewing the stereoscopic image with a single eye (i.e., the left eye or the right eye).

To solve the problem of the 3D crosstalk at the vertical viewing angle in the polarized-glasses-type stereoscopic image display, Japanese Laid Open Publication No. 2002-185983 proposed a method for forming black stripes on a patterned retarder (or 3D film) of a stereoscopic image display. In a method different from this method, the width of black matrices formed on a liquid crystal display panel can be increased. However, the formation of the black stripes on the patterned retarder may result in a reduction in luminance of 2D and 3D images, and the black matrices may interact with the black stripes, thereby generating moiré. Further, an increase in the width of the black matrices may reduce an aperture ratio, thereby reducing the luminance of the 2D and 3D images.

To solve the problem of the polarized glasses type stereoscopic image display disclosed in Japanese Laid Open Publication No. 2002-185983, Korean Patent Application No. 10-2009-0033534, filed on Apr. 17, 2009, and U.S. application Ser. No. 12/536,031, filed on Aug. 5, 2009, disclose a technology for dividing each of pixels of a display panel into two parts and controlling one of the two parts using an active black stripe. Korean Patent Application No. 10-2009-0033534 and U.S. application Ser. No. 12/536,031 are commonly assigned to the assignee of the present application, the contents of which are hereby incorporated herein by reference in their entirety. The stereoscopic image display proposed in the above-mentioned Korean and U.S. applications divides each of the pixels into the two parts and writes 2D image data to each of the divided pixels in a 2D mode to thereby prevent a reduction in a luminance of a 2D image, and also widens a vertical viewing angle of a 3D image. Hence, the stereoscopic image display proposed in the above-mentioned Korean and U.S. applications may improve the visibility of both the 2D and 3D images and may provide more excellent display quality than the existing stereoscopic image display. The active black stripe may include a thin film transistor (TFT) and a liquid crystal cell. However, in the active black stripe technology, the number of gate lines increased because of the division of each pixel into the two parts, and thus configuration of a gate driver became complicated.

Accordingly, Korean Patent Application No. 10-2010-0023888, filed on Mar. 17, 2010, proposed a technology for discharging a voltage of a liquid crystal cell of an active black stripe up to a voltage of a black gray level in a 3D mode. Korean Patent Application No. 10-2010-0023888 is commonly assigned to the assignee of the present application, the content of which is incorporated herein by reference in its entirety. In this technology, a discharge control voltage was applied to a TFT of the active black stripe so as to discharge the active black stripe in the 3D mode. The discharge control voltage may be commonly supplied to the TFTs of all the active black stripes through a control line. The discharge control voltage may vary depending on a position of the display panel due to a line resistance of the control line. In this instance, because the discharge control voltage applied to the TFT of the active black stripe at the position greatly affected by the line resistance was less than a desired value, it was difficult to completely represent the black gray level. To increase the completeness of the technology of the active black stripe in the 3D mode, it is necessary to compensate for the discharge control voltage, so that the active black stripes on the entire screen can completely represent the black gray level.

SUMMARY

Embodiments of the present disclosure provide a stereoscopic image display configured so that active black stripes of the entire screen can completely represent a black gray level in a 3D mode.

In one aspect, a stereoscopic image display includes a display panel, a data driving circuit, a gate driving circuit, a control voltage generator, and a control voltage compensator. The display panel includes data lines, gate lines crossing the data lines, a discharge control line, and a plurality of pixels. Each of the plurality of pixels is divided into a main display unit and an auxiliary display unit. The data driving circuit is configured to supply a data voltage of a 2D image to the data lines in a 2D mode and supply a data voltage of a 3D image to the data lines in a 3D mode. The gate driving circuit is configured to sequentially supply a scan pulse, which swings between a gate low voltage and a gate high voltage, to the gate lines in the 2D mode and the 3D mode. The control voltage generator is configured to generate a discharge control voltage to be applied to the discharge control line at a slight-on level, which is higher than the gate low voltage and is lower than the gate high voltage, and periodically reduce the discharge control voltage to a level of the gate low voltage in the 3D mode. The control voltage compensator is configured to receive the discharge control voltage from the control voltage generator, amplify a feedback discharge control voltage supplied from a first part of the display panel based on the received discharge control voltage, and apply the amplified feedback discharge control voltage, as a compensated discharge control voltage, to a second part opposite the first part of the display panel.

BRIEF DESCRIPTION OF THE DRAWINGS

The accompanying drawings, which are included to provide a further understanding of the present disclosure and are incorporated in and constitute a part of this specification, illustrate embodiments of the present disclosure and together with the description serve to explain the principles of the present disclosure. In the drawings.

DETAILED DESCRIPTION OF THE EXEMPLARY EMBODIMENTS

Reference will now be made in detail to embodiments of the present disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the present disclosure.

Exemplary embodiments of the present disclosure will be described with reference to FIGS. 1 to 16.

Figure 1:
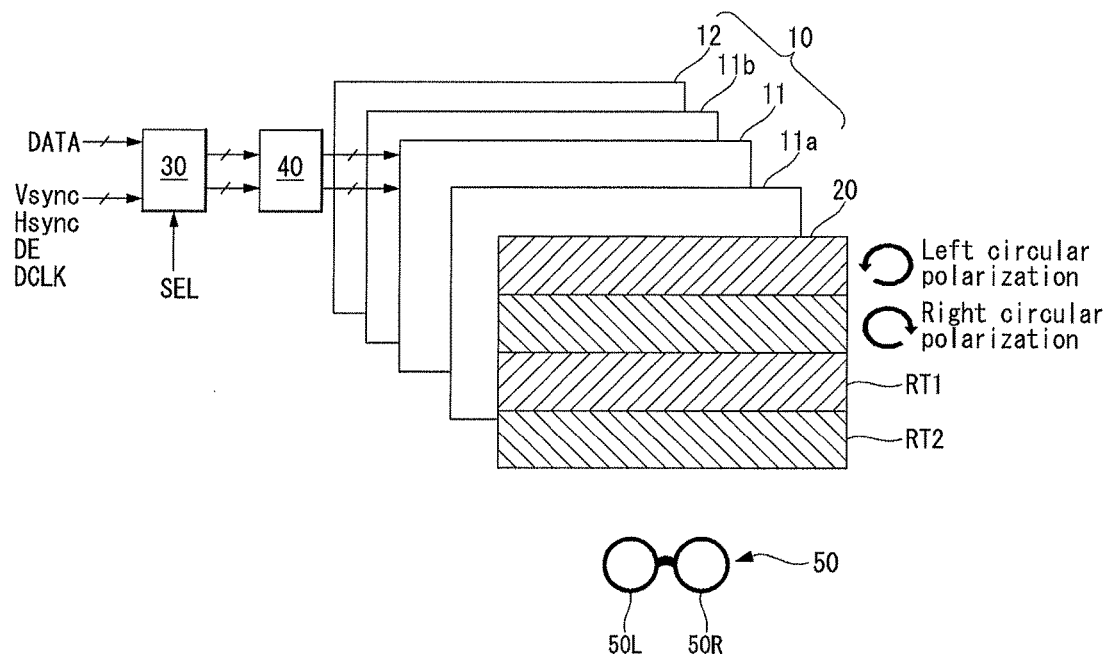
FIGS. 1 and 2 illustrate a polarized glasses type stereoscopic image display according to an exemplary embodiment of the present disclosure.
Figure 2:
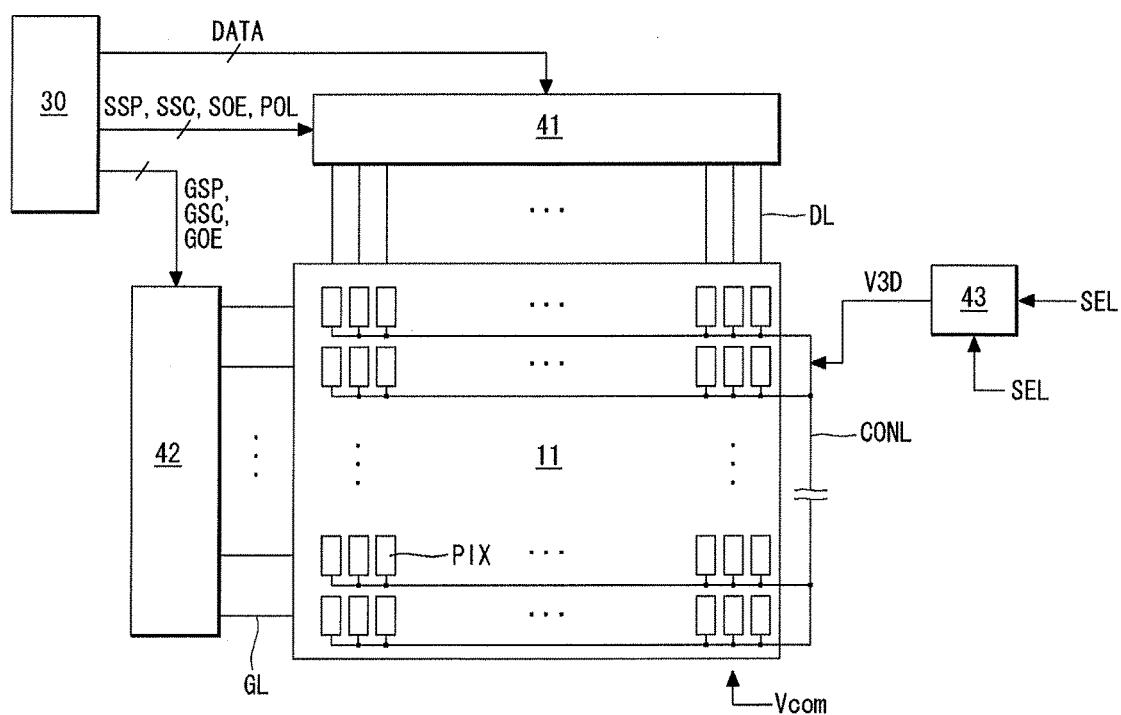
Figure 3:
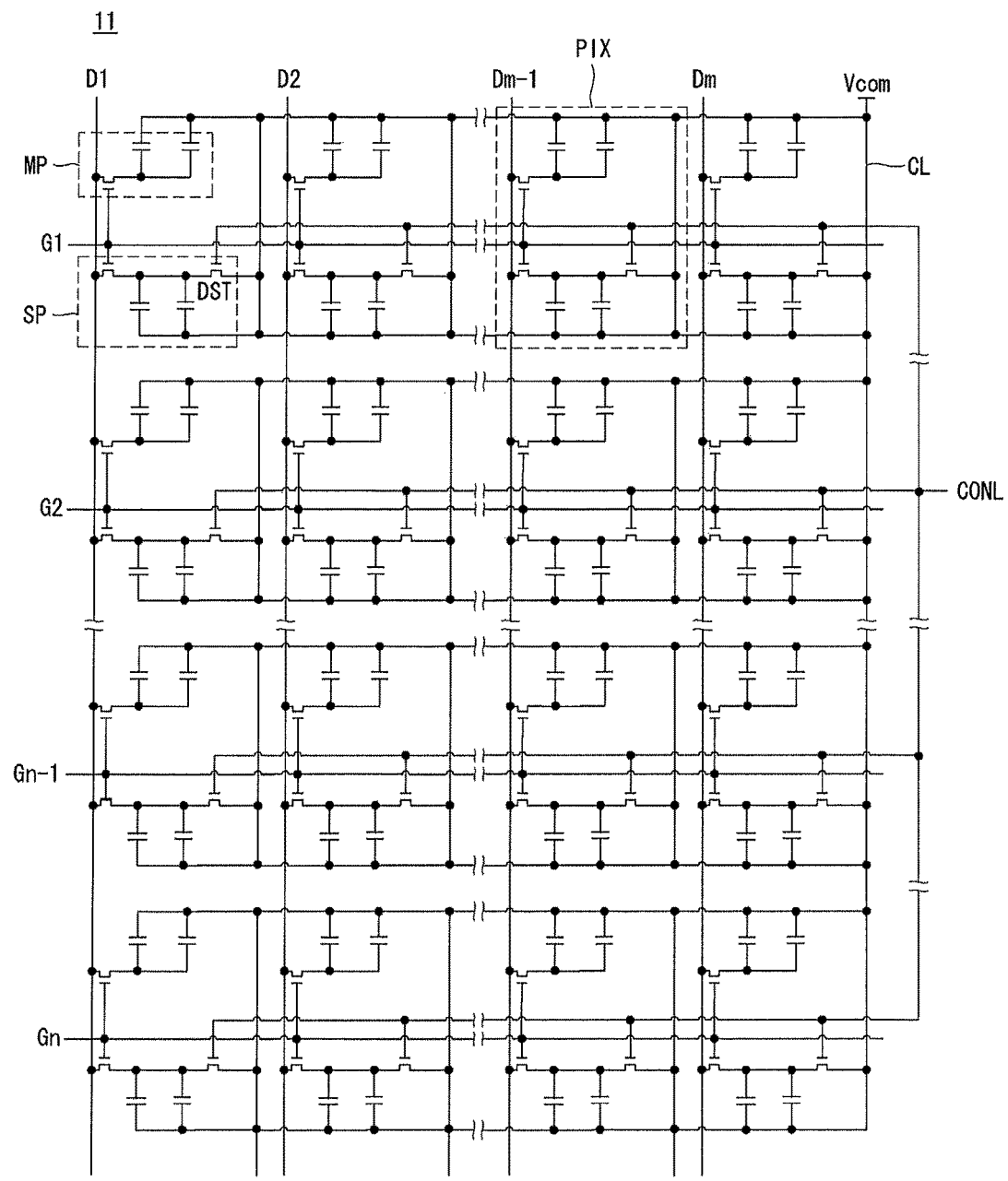
FIG. 3 is an equivalent circuit diagram schematically illustrating a pixel array of a display panel shown in FIG. 2.

FIGS. 1 and 2 illustrate a polarized glasses type stereoscopic image display according to an exemplary embodiment of the present disclosure. FIG. 3 schematically illustrates a pixel array of a display panel shown in FIG. 2. In FIG. 3, D1 to Dm denote data lines, and G1 to Gn denote gate lines.

As shown in FIGS. 1 to 3, the stereoscopic image display according to the embodiment of the present disclosure includes a display element 10, a patterned retarder 20, a controller 30, a panel driving circuit 40, and polarized glasses 50.

The display element 10 may be implemented as a flat panel display, such as a liquid crystal display (LCD), a field emission display (FED), a plasma display panel (PDP) display, an electroluminescence device (EL) including an inorganic electroluminescence element and an organic light emitting diode (OLED), and an electrophoretic display (EPD). In the following description, the stereoscopic image display according to the embodiment of the present disclosure is described using the liquid crystal display as the display element 10.

The display element 10 includes a display panel 11, an upper polarizing film 11a, and a lower polarizing film 11b.

The display panel 11 displays a 2D image in a 2D mode, and displays a 3D image in a 3D mode. The display panel 11 includes an upper glass substrate, a lower glass substrate, and a liquid crystal layer between the upper and lower glass substrates. A plurality of data lines DL, a plurality of gate lines GL crossing the data lines DL, a common line CL to which a common voltage Vcom is supplied, a discharge control line CONL to which a discharge control voltage V3D is supplied, are formed on the lower glass substrate of the display panel 11. Black matrixes and color filters are formed on the upper glass substrate of the display panel 11.

The upper polarizing film 11a is attached to the upper glass substrate of the display panel 11, and the lower polarizing film 11b is attached to the lower glass substrate of the display panel 11. Alignment layers for setting a pre-tilt angle of liquid crystals are respectively formed on the upper and lower glass substrates of the display panel 11. In a vertical electric field driving manner such as a twisted nematic (TN) mode and a vertical alignment (VA) mode, common electrodes, to which the common voltage Vcom is supplied, may be formed on the upper glass substrate. In a horizontal electric field driving manner such as an in-plane switching (IPS) mode and a fringe field switching (FFS) mode, the common electrodes may be formed on the lower glass substrate along with pixel electrodes. A column spacer may be formed between the upper and lower glass substrates to keep cell gaps of the liquid crystal cells of the display panel 11 constant.

The display element 10 according to the embodiment of the present disclosure may be implemented in any type of liquid crystal display including a transmissive liquid crystal display, a transflective liquid crystal display, and a reflective liquid crystal display. A backlight unit 12 is necessary in the transmissive liquid crystal display and the transflective liquid crystal display. The backlight unit 12 may be implemented as a direct type backlight unit or an edge type backlight unit.

A plurality of unit pixels are disposed on the display panel 11 in a matrix form based on a crossing structure between the data lines DL and the gate lines GL, thereby constituting a pixel array. Each of the unit pixels includes three pixels PIX for respectively displaying red, green, and blue images. As shown in FIG. 3, each pixel PIX includes a main display unit MP and an auxiliary display unit SP functioning as an active black stripe. The auxiliary display units SP of the pixels are commonly connected to the discharge control line CONL. The discharge control voltage V3D for controlling a discharge operation of the auxiliary display units SP is supplied to discharge control switches DST of the auxiliary display units SP through the discharge control line CONL.

The main display unit MP displays video data of the 2D image in the 2D mode, and displays video data of the 3D image in the 3D mode. On the other hand, the auxiliary display unit SP displays the video data of the 2D image in the 2D mode, but displays an image of a black gray level in the 3D mode. Namely, the auxiliary display unit SP serves as the active black stripe in the 3D mode. The auxiliary display unit SP increases an aperture ratio and a luminance of the 2D image in the 2D mode, and widens a vertical viewing angle of the 3D image in the 3D mode. The sizes and the shapes of the main display unit MP and the auxiliary display unit SP of one pixel may be properly designed in consideration of driving characteristics of the display panel, a luminance of a display image, a viewing angle of the 3D image, characteristics of applied products, etc.

The patterned retarder 20 is attached to the upper polarizing film 11a of the display panel 11. The patterned retarder 20 includes a plurality of first retarders RT1 respectively formed on odd-numbered lines of the patterned retarder 20, and a plurality of second retarders RT2 respectively formed on even-numbered lines of the patterned retarder 20. Light absorption axes of the first retarders RT1 are different from light absorption axes of the second retarders RT2. The first retarders RT1 are opposite to odd-numbered horizontal pixel lines of the pixel array, and the second retarders RT2 are opposite to even-numbered horizontal pixel lines of the pixel array. The first retarders RT1 retard a phase of linearly polarized light incident through the upper polarizing film 11a by a quarter wavelength and transmit it as first polarized light (for example, left-circularly polarized light). The second retarders RT2 retard a phase of linearly polarized light incident through the upper polarizing film 11a by three-quarter wavelength and transmit it as second polarized light (for example, right-circularly polarized light).

The controller 30 controls an operation of the panel driving circuit 40 in conformity with the 2D mode or the 3D mode in response to a mode selection signal SEL. The controller 30 receives the mode selection signal SEL through a user interface, such as a touch screen, an on-screen display (OSD), a keyboard, a mouse, and a remote controller. The controller 30 may switch between an operation of the 2D mode and an operation of the 3D mode in response to the mode selection signal SEL. The controller 30 detects a 2D/3D identification code encoded to data of an input image, for example, a 2D/3D identification code capable of being coded to an electronic program guide (EPG) or an electronic service guide (ESG) of a digital broadcasting standard, thereby distinguishing between the 2D mode and the 3D mode.

In the 3D mode, the controller 30 divides 3D image data received from a video source into RGB data of a left eye image and RGB data of a right eye image. The controller 30 then supplies the RGB data of the left eye image and the RGB data of the right eye image to a data driver 41 of the panel driving circuit 40. In the 2D mode, the controller 30 supplies RGB data of a 2D image received from the video source to the data driver 41.

The controller 30 generates control signals for controlling operation timing of the panel driving circuit 40 using timing signals such as a vertical sync signal Vsync, a horizontal sync signal Hsync, a data enable DE, and a dot clock DCLK.

A data control signal for controlling operation timing of the data driver 41 of the panel driving circuit 40 includes a source start pulse SSP, a source sampling clock SSC, a source output enable SOE, a polarity control signal POL, and the like. The source start pulse SSP indicates a supply start time of data corresponding to one horizontal line in one horizontal period during which the data corresponding to the one horizontal line is displayed. The source sampling clock SSC controls a latch operation of data based on a rising or falling edge thereof. The source output enable SOE controls an output of the data driver 41. The polarity control signal POL controls a polarity of a data voltage to be supplied to the liquid crystal cells of the display panel 11.

A gate control signal for controlling operation timing of a gate driver 42 of the panel driving circuit 40 includes a gate start pulse GSP, a gate shift clock GSC, a gate output enable GOE, and the like. The gate start pulse GSP indicates a start horizontal line of a scan operation in one vertical period during which one screen is displayed. The gate shift clock GSC is input to a shift register inside the gate driver 42 and sequentially shifts the gate start pulse GSP. The gate output enable GOE controls an output of the gate driver 42.

The controller 30 multiplies the frequency of the timing signals Vsync, Hsync, DE, and DCLK synchronized with an input frame frequency by N to obtain a frame frequency of (f×N) Hz, where N is a positive integer equal to or greater than 2, and f is the input frame frequency. Hence, the controller 30 may control the operation of the panel driving circuit 40 based on the frame frequency of (f×N) Hz. The input frame frequency is 50 Hz in a phase alternate line (PAL) scheme and 60 Hz in a national television standards committee (NTSC) scheme.

The panel driving circuit 40 includes the data driver 41 for driving the data lines DL of the display panel 11, the gate driver 41 for driving the gate lines GL of the display panel 11, and a discharge control voltage generating circuit 43 for driving the discharge control line CONL of the display panel 11.

The data driver 41 includes a plurality of driver integrated circuits (ICs). Each of the driver ICs includes a shift register, a latch, a digital-to-analog converter (DAC), an output buffer, etc. The data driver 41 latches the RGB data of the 2D or 3D image in response to the data control signals SSP, SSC, and SOE. The data driver 41 converts the RGB data of the 2D/3D image into analog positive and negative gamma compensation voltages in response to the polarity control signal POL and inverts a polarity of the data voltage. The data driver 41 outputs the data voltage to the data lines DL, so that the data voltage is synchronized with a scan pulse (or a gate pulse) output from the gate driver 42. The driver ICs of the data driver 41 may be bonded to the lower glass substrate of the display panel 11 through a tape automated bonding (TAB) process.

The gate driver 42 generates the scan pulse, which swings between a gate high voltage and a gate low voltage, in response to the gate control signals GSP, GSC, and GOE. The gate driver 42 supplies the scan pulse to the gate lines GL in a line sequential manner in response to the gate control signals GSP, GSC, and GOE. The gate driver 42 includes a gate shift register array, etc. The gate shift register array of the gate driver 42 may be formed in a non-display area outside a display area of the display panel 11, in which the pixel array is formed, in a gate-in-panel (GIP) manner. A plurality of gate shift registers included in the gate shift register array may be formed with along the pixel array in a thin film transistor (TFT) process of the pixel array in the GIP manner. The gate shift register array of the gate driver 42 may be implemented as driver ICs bonded to the lower glass substrate of the display panel 11 through the TAB process.

The discharge control voltage generating circuit 43 differently generates the discharge control voltage V3D in response to the mode selection signal SEL. In the 2D mode, the discharge control voltage V3D may be generated at a level substantially equal to the gate low voltage. In the 3D mode, the discharge control voltage V3D is generated at a slight-on level, which is higher than the gate low voltage and is lower than the gate high voltage, and also may be periodically reduced to a level of the gate low voltage.

The polarized glasses 50 include a left eyeglass 50L having a left eye polarizing filter and a right eyeglass 50R having a right eye polarizing filter. The left eye polarizing filter has the same light absorption axis as the first retarder RT1 of the patterned retarder 20, and the right eye polarizing filter has the same light absorption axis as the second retarder RT2 of the patterned retarder 20. For example, a left circular polarizing filter may be selected as the left eye polarizing filter of the polarized glasses 50, and a right circular polarizing filter may be selected as the right eye polarizing filter of the polarized glasses 50. A user may view the 3D image, which is displayed on the display element 10 in a spatial division manner, through the polarized glasses 50.

Figure 4:
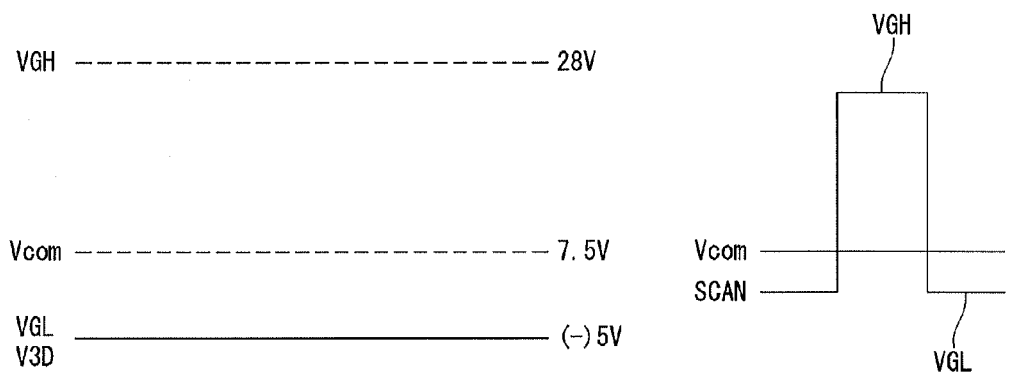
FIG. 4 illustrates a discharge control voltage generated at a gate low voltage in a 2D mode.
Figure 5:
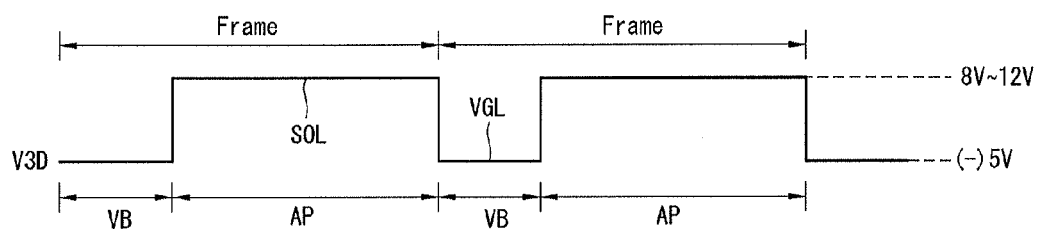
FIG. 5 illustrates a discharge control voltage generated in a 3D mode.

FIG. 4 illustrates the discharge control voltage V3D generated in the 2D mode, and FIG. 5 illustrates the discharge control voltage V3D generated in the 3D mode.

As shown in FIGS. 4 and 5, the discharge control voltage V3D may be generated at the same level as a gate low voltage VGL of a scan pulse SCAN in the 2D mode. When the gate low voltage VGL of the scan pulse SCAN capable of turning off switches ST1 and ST2 (refer to FIG. 6) of the display panel 11 is about −5V, a 2D control voltage V2D may be generated at about −5V.

In the 3D mode, the discharge control voltage V3D is generated at a slight-on level SOL. Further, the discharge control voltage V3D may be reduced to the gate low voltage VGL at predetermined time intervals, so as to reduce a positive gate bias stress of the discharge control switch DST. The slight-on level SOL may be set to be higher than the common voltage Vcom and to be lower than a gate high voltage VGH of the scan pulse SCAN, so as to minimize an influence of a kickback voltage in a discharge process. When the gate high voltage VGH of the scan pulse SCAN capable of fully turning on the switches ST1 and ST2 of the display panel 11 is about 28V and the common voltage Vcom is about 7.5V, the discharge control voltage V3D of the slight-on level SOL may be generated at about 8V to 12V.

In the 3D mode, a period, during which the discharge control voltage V3D of the slight-on level SOL is generated, may correspond to a display period AP of each frame, in which effective video data is displayed. A period, during which the discharge control voltage V3D of the gate low voltage VGL is generated, may correspond to a non-display period (i.e., a vertical blank period VB) between the adjacent display periods AP. A length of the period, during which the discharge control voltage V3D of the slight-on level SOL is generated, may be greater than a length of the display period AP, so as to secure a discharge period of a lowermost horizontal pixel line.

Figure 6:
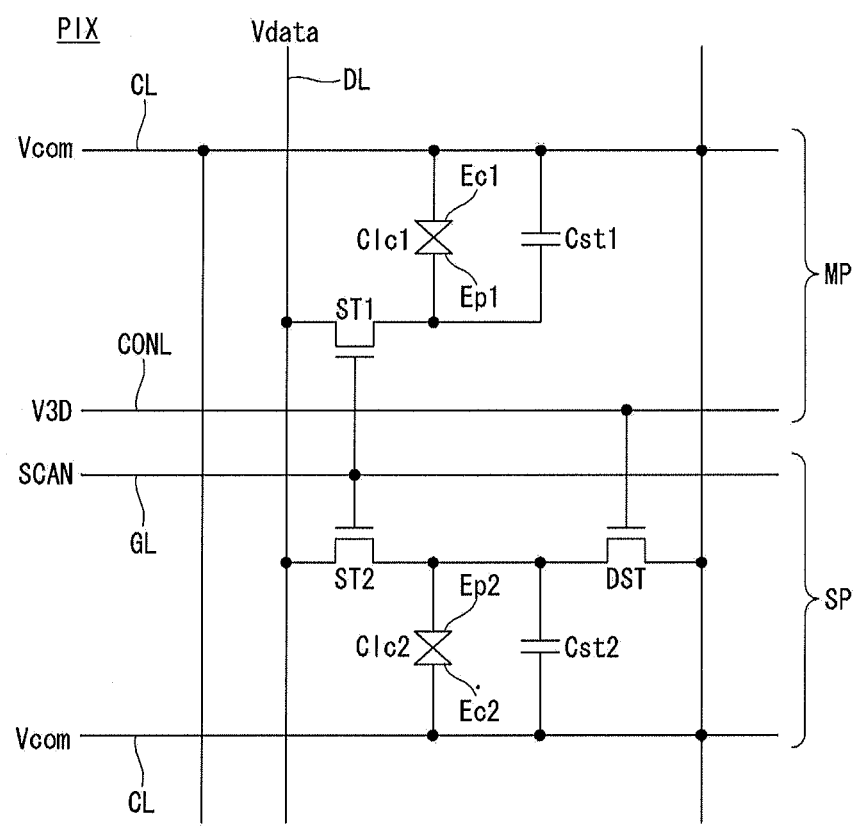
FIG. 6 is an equivalent circuit diagram illustrating in detail a connection configuration of a pixel shown in FIGS. 2 and 3.

FIG. 6 illustrates in detail a connection configuration of the pixel PIX shown in FIGS. 2 and 3.

As shown in FIG. 6, the main display unit MP includes a first pixel electrode Ep1, a first common electrode Ec1 which is opposite to the first pixel electrode Ep1 to constitute a first liquid crystal (LC) capacitor Clc1, and a first storage capacitor Cst1. The first pixel electrode Ep1 is connected to the data line DL through the first switch ST1. The first switch ST1 is turned on in response to the scan pulse SCAN, and thus a data voltage Vdata on the data line DL is applied to the first pixel electrode Ep1. A gate electrode of the first switch ST1 is connected to the gate line GL, a source electrode of the first switch ST1 is connected to the data line DL, and a drain electrode of the first switch ST1 is connected to the first pixel electrode Ep1. The first common electrode Ec1 is connected to the common line CL charged to the common voltage Vcom. The first storage capacitor Cst1 is formed by an overlap of the first pixel electrode Ep1 and the common line CL with an insulating layer interposed between them.

The auxiliary display unit SP includes a second pixel electrode Ep2, a second common electrode Ec2 which is opposite to the second pixel electrode Ep2 to constitute a second LC capacitor Clc2, and a second storage capacitor Cst2. The second pixel electrode Ep2 is connected to the data line DL through the second switch ST2. The second switch ST2 is turned on in response to the scan pulse SCAN, and thus the data voltage Vdata on the data line DL is applied to the second pixel electrode Ep2. A gate electrode of the second switch ST2 is connected to the gate line GL, a source electrode of the second switch ST2 is connected to the data line DL, and a drain electrode of the second switch ST2 is connected to the second pixel electrode Ep2. The second common electrode Ec2 is connected to the common line CL charged to the common voltage Vcom. The second storage capacitor Cst2 is formed by an overlap of the second pixel electrode Ep2 and the common line CL with an insulating layer interposed between them.

The second pixel electrode Ep2 is connected to the common line CL through the discharge control switch DST. The discharge control switch DST switches on or off a current path between the second pixel electrode Ep2 and the common line CL in response to the discharge control voltage V3D. A gate electrode of the discharge control switch DST is connected to the discharge control line CONL, a source electrode of the discharge control switch DST is connected to the second pixel electrode Ep2, and a drain electrode of the discharge control switch DST is connected to the common line CL. When the discharge control voltage V3D generated at the same level as the gate low voltage VGL is applied, the discharge control switch DST completely closes a source-drain channel of the discharge control switch DST and cuts off the current path between the second pixel electrode Ep2 and the common line CL. When the discharge control voltage V3D of the slight-on level SOL is applied, the discharge control switch DST partially opens the source-drain channel of the discharge control switch DST and partially allows the current path between the second pixel electrode Ep2 and the common line CL.

The discharge control switch DST is designed, so that it has the same channel capacitance as the first and second switches ST1 and ST2. Thus, the discharge control switch DST is turned on at the slight-on level SOL lower than a full-on level by applying the discharge control voltage V3D of the slight-on level SOL less than the gate high voltage VGH to the discharge control switch DST. Even if the second switch ST2 and the discharge control switch DST are simultaneously turned on, an amount of current flowing through the discharge control switch DST is less than an amount of current flowing through the second switch ST2. Because a channel resistance is inversely proportional to the voltage applied to the gate electrode, a channel resistance of the discharge control switch DST is greater than a channel resistance of the second switch ST2 even if the second switch ST2 and the discharge control switch DST are simultaneously turned on.

Figure 7:
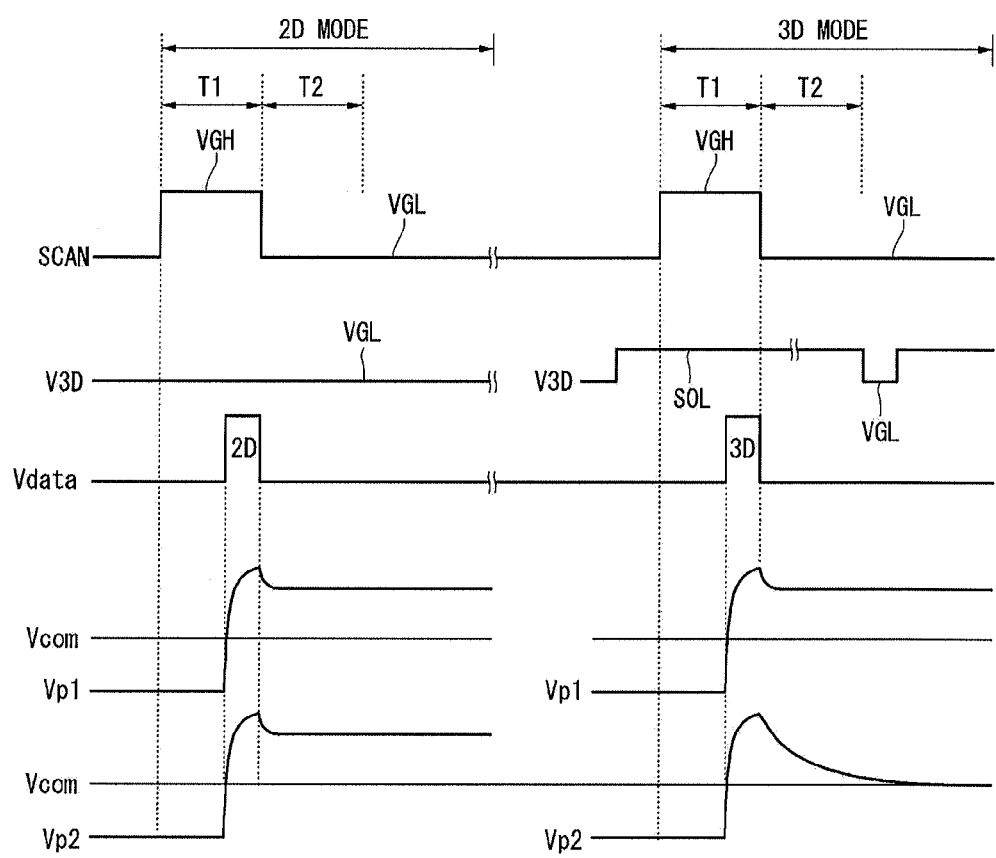
FIG. 7 illustrates charge and discharge waveforms of a pixel in each driving mode.
Figure 8:
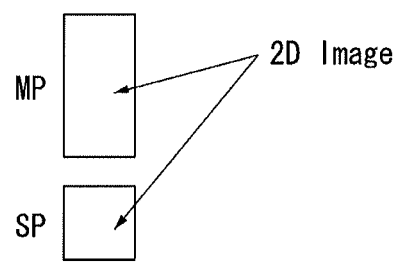
FIGS. 8 and 9 illustrate an operation of an auxiliary display unit in a 2D mode and a 3D mode, respectively.
Figure 9:
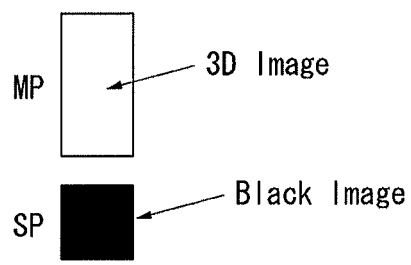

FIG. 7 illustrates charge and discharge waveforms of the pixel PIX in each driving mode. FIGS. 8 and 9 illustrate an operation of the auxiliary display unit in the 2D mode and the 3D mode, respectively.

An operation and an operational effect of the pixel PIX in each driving mode are described with reference to FIGS. 7 to 9.

First, an operation and an operational effect of the pixel PIX in the 2D mode are described below.

The discharge control switch DST is continuously held in an off-state in response to the discharge control voltage V3D of the same level as the gate low voltage VGL during periods T1 and T2.

During the period T1, the first and second switches ST1 and ST2 are simultaneously turned on at the full-on level in response to the scan pulse SCAN of the gate high voltage VGH.

The first pixel electrode Ep1 of the main display unit MP is charged to a first pixel voltage Vp1 as the data voltage Vdata for the display of the 2D image due to the turn-on operation of the first switch ST1. The second pixel electrode Ep2 of the auxiliary display unit SP is charged to a second pixel voltage Vp2 as the data voltage Vdata for the display of the 2D image due to the turn-on operation of the second switch ST2. Because the first and second switches ST1 and ST2 are equally designed, the second pixel voltage Vp2 is substantially equal to the first pixel voltage Vp1.

During the period T2, the first and second switches ST1 and ST2 are simultaneously turned off in response to the scan pulse SCAN of the gate low voltage VGL.

When the first switch ST1 is turned off, the first pixel voltage Vp1, which has been charged to the first pixel electrode Ep1 of the main display unit MP, is shifted by a predetermined value because of an influence of the kickback voltage and then is held at a shifted value by the first storage capacitor Cst1. When the second switch ST2 is turned off, the second pixel voltage Vp2, which has been charged to the second pixel electrode Ep2 of the auxiliary display unit SP, is shifted by a predetermined value because of the influence of the kickback voltage and then is held at a shifted value by the second storage capacitor Cst2.

During the periods T1 and T2, the common voltage Vcom is applied to the first common electrode Ec1 of the main display unit MP and the second common electrode Ec2 of the auxiliary display unit SP through the common line CL. A difference between the first pixel voltage Vp1 and the common voltage Vcom is be held to be substantially equal to a difference between the second pixel voltage Vp2 and the common voltage Vcom. A transmittance of the liquid crystal cells is proportional to a voltage difference between the pixel electrode and the common electrode in a normally black liquid crystal mode. As a result, as shown in FIG. 8, the main display unit MP and the auxiliary display unit SP display the 2D image of the same gray level. The 2D image displayed on the auxiliary display unit SP functions to increase the luminance of the 2D image.

Next, an operation and an operational effect of the pixel PIX in the 3D mode are described below.

The discharge control switch DST repeats an on-state of the slight-on level SOL and an off-state of the slight-on level SOL at predetermined time intervals in response to the discharge control voltage V3D. For example, the discharge control switch DST is held in the on-state of the slight-on level SOL during the display period AP, and is held in the off-state of the slight-on level SOL during the vertical blank period VB between the display periods AP. The following periods T1 and T2 belong to the display period AP.

During the period T1, the first and second switches ST1 and ST2 are simultaneously turned on at the full-on level in response to the scan pulse SCAN of the gate high voltage VGH.

The first pixel electrode Ep1 of the main display unit MP is charged to the first pixel voltage Vp1 as the data voltage Vdata for the display of the 3D image due to the turn-on operation of the first switch ST1. The second pixel electrode Ep2 of the auxiliary display unit SP is charged to the second pixel voltage Vp2 as the data voltage Vdata for the display of the 3D image due to the turn-on operation of the second switch ST2. During the period T1, a channel resistance of the discharge control switch DST having the on-state of the slight-on level is much greater than a channel resistance of the second switch ST2 having the on-state of the full-on level. Hence, an amount of discharge current drained from the second pixel electrode Ep2 is much less than an amount of charge current entering into the second pixel electrode Ep2. As a result, during the period T1, the discharge control switch DST having the on-state of the slight-on level hardly affects charge characteristic of the second pixel voltage Vp2, and the second pixel voltage Vp2 is similar to the first pixel voltage Vp1.

During the period T2, the first and second switches ST1 and ST2 are simultaneously turned off in response to the scan pulse SCAN of the gate low voltage VGL.

When the first switch ST1 is turned off, the first pixel voltage Vp1, which has been charged to the first pixel electrode Ep1 of the main display unit MP, is shifted by a predetermined value because of the influence of the kickback voltage and then is held at a shifted value by the first storage capacitor Cst1. When the second switch ST2 is turned off, the second pixel voltage Vp2, which has been charged to the second pixel electrode Ep2 of the auxiliary display unit SP, is discharged to the level of the common voltage Vcom for a predetermined period of time because of the discharge current drained via the discharge control switch DST. A channel resistance of the discharge control switch DST having the on-state of the slight-on level is much less than a channel resistance of the second switch ST2 having the off-state. As a result, the second pixel voltage Vp2, which has been charged to the second pixel electrode Ep2 of the auxiliary display unit SP through the discharge control switch DST, is gradually discharged and then is converged at the level of the common voltage Vcom without the influence of the kickback voltage.

During the periods T1 and T2, the common voltage Vcom is applied to the first common electrode Ec1 of the main display unit MP and the second common electrode Ec2 of the auxiliary display unit SP. Unlike the difference between the first pixel voltage Vp1 and the common voltage Vcom, a difference between the second pixel voltage Vp2 and the common voltage Vcom becomes substantially zero at a time when the discharge of the second pixel electrode Ep2 has been completed. As a result, as shown in FIG. 9, according to the voltage difference-transmittance characteristic in the normally black liquid crystal mode, the main display unit MP displays the 3D image of a predetermined gray level, and the auxiliary display unit SP displays an image of a black gray level. Thus, the auxiliary display unit SP serves as the active black stripe.

The black image displayed on the auxiliary display unit SP increases a display distance between the 3D images (i.e., between the left eye image and the right eye image), which are adjacent to each other in a vertical direction. Hence, the vertical viewing angle of the 3D image, at which a crosstalk is not generated, may be widely secured using the black image of the auxiliary display unit SP without a separate black stripe pattern.

Figure 10:
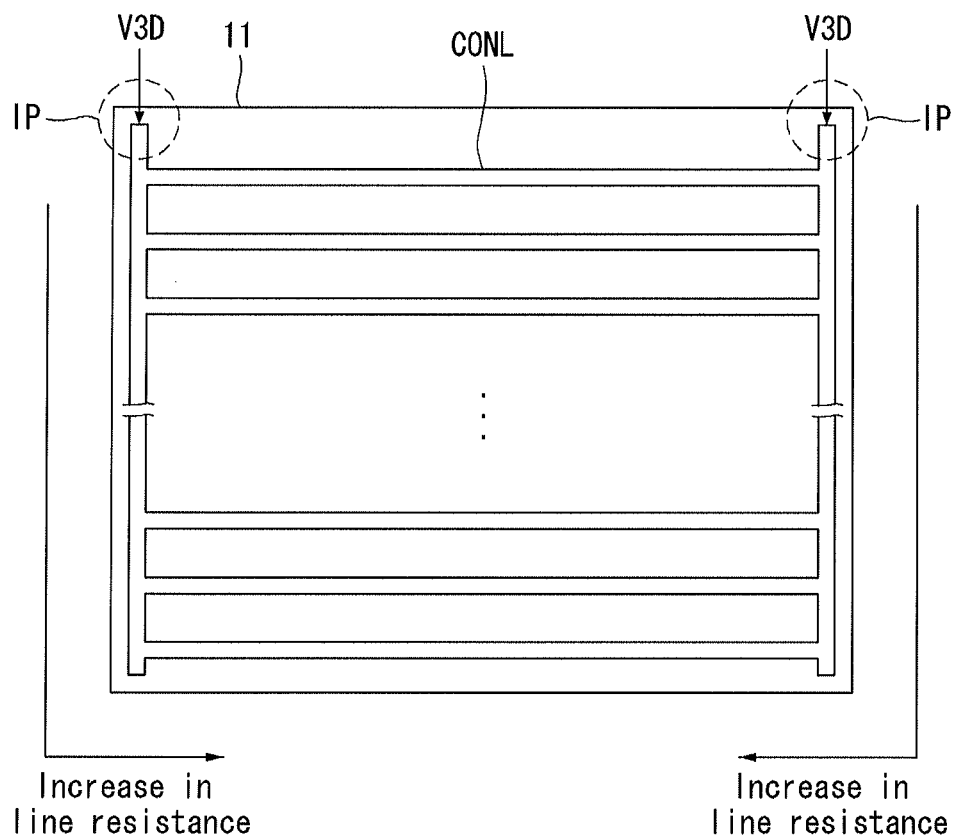
FIG. 10 illustrates an example where a discharge control line is formed on a display panel.
Figure 11:
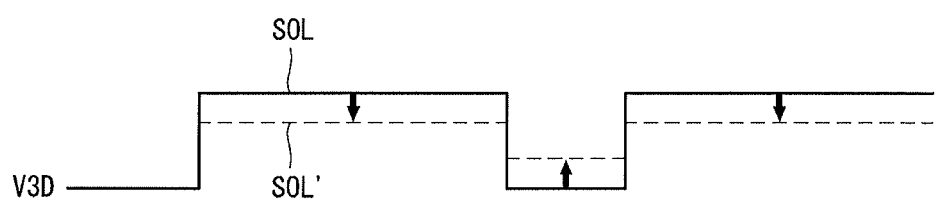
FIG. 11 illustrates an example where a discharge control voltage varies depending on a position due to a line resistance of a discharge control line.
Figure 12:
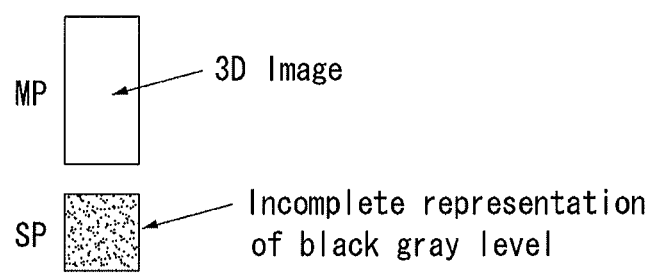
FIG. 12 illustrates a 3D display state of a pixel having a maximum drop amount of a discharge control voltage.

FIG. 10 illustrates an example where the discharge control line CONL is formed on the display panel 11. FIG. 11 illustrates an example where the discharge control voltage V3D varies depending on a position due to a line resistance of the discharge control line CONL. FIG. 12 illustrates a 3D display state of a pixel having a maximum drop amount of the discharge control voltage V3D.

As shown in FIG. 10, the discharge control line CONL formed on the display panel 11 is electrically connected. A line resistance of the discharge control line CONL increases as it goes away from an input position IP of the discharge control voltage V3D. When the discharge control voltage V3D is input to an upper portion of the display panel 11 as shown in FIG. 10, the line resistance of the discharge control line CONL gradually increases as it goes to a lower portion of the display panel 11.

A drop amount of the discharge control voltage V3D is proportional to the line resistance of the discharge control line CONL. Thus, as shown in FIG. 11, the discharge control voltage V3D supplied to a pixel far away from the input position IP of the discharge control voltage V3D is reduced to a level SOL' lower than a desired level (i.e., the slight-on level SOL).

Because the discharge control voltage V3D has to swing between the slight-on level SOL and the gate low voltage VGL as shown in FIG. 5, the discharge of the auxiliary display unit SP has to be completed within a period of time shorter than the vertical blank period VB. When the discharge control voltage V3D is reduced to the level lower than the slight-on level SOL, a discharge time of the voltage charged to the auxiliary display unit SP of the pixel becomes longer than a previously designed time (for example, 10 to 15 horizontal periods). Thus, the auxiliary display units SP on a lowermost horizontal pixel line having a maximum drop amount of the discharge control voltage V3D are difficult to completely represent the black gray level because of an insufficient discharge time. As a result, as shown in FIG. 12, the auxiliary display unit SP is difficult to serve as the active black stripe.

Figure 13:
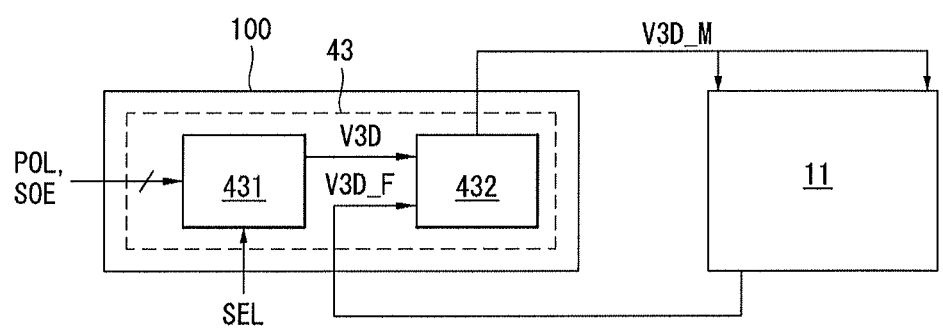
FIG. 13 illustrates a detailed configuration of a discharge control voltage generating circuit to compensate for a discharge control voltage.

FIG. 13 illustrates a detailed configuration of the discharge control voltage generating circuit 43 configured so that the auxiliary display units of the entire screen can completely represent the black gray level through the compensation for the discharge control voltage V3D.

As shown in FIG. 13, the discharge control voltage generating circuit 43 includes a control voltage generator 431 and a control voltage compensator 432. The control voltage generator 431 and the control voltage compensator 432 may be mounted on a 3D board 100.

The control voltage generator 431 differently generates the discharge control voltage V3D in response to the mode selection signal SEL. The control voltage generator 431 may include a power IC and a level shifter. In the 2D mode, the control voltage generator 431 level-shifts an input DC voltage supplied by the power IC, thereby generating the discharge control voltage V3D of the gate low voltage VGL as shown in FIG. 4. In the 3D mode, the control voltage generator 431 generates a control pulse including a high period (i.e., an SOL period of FIG. 5) and a low period (i.e., a VGL period of FIG. 5) based on the polarity control signal POL, the source output enable SOE, etc. received from the controller 30. Further, in the 3D mode, the control voltage generator 431 level-shifts the control pulse using the input DC voltage supplied by the power IC, thereby generating the discharge control voltage V3D alternating the slight-on level SOL and the gate low voltage VGL as shown in FIG. 5.

The control voltage compensator 432 receives the discharge control voltage V3D from the control voltage generator 431 and differentially amplifies a feedback discharge control voltage V3D_F supplied from a first part of the display panel 11 based on the received discharge control voltage V3D. Then, the control voltage compensator 432 applies the differentially amplified feedback discharge control voltage V3D_F, as a compensated discharge control voltage V3D_M, to a second part opposite the first part of the display panel 11. In this instance, the first part of the display panel 11 has the line resistance of the discharge control line CONL greater than that in the second part of the display panel 11, and thus may correspond to a lowermost horizontal pixel line HL#n (refer to FIG. 16) of the display panel 11. Further, the second part of the display panel 11 may correspond to an uppermost horizontal pixel line HL#1 (refer to FIG. 16) of the display panel 11.

The slight-on level SOL of the compensated discharge control voltage V3D_M is higher than the slight-on level SOL of the discharge control voltage V3D through the differential amplification, so that the auxiliary display units SP of the lowermost horizontal pixel line HL#n completely represent the black gray level.

Figure 14:
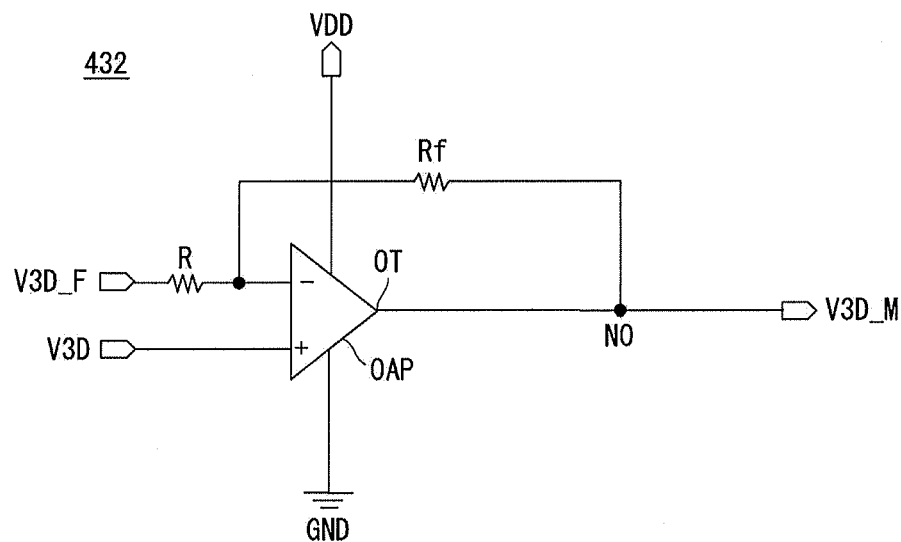
FIG. 14 illustrates an example of a control voltage compensator shown in FIG. 13.

FIG. 14 illustrates an example of the control voltage compensator 432 shown in FIG. 13.

As shown in FIG. 14, the control voltage compensator 432 may be implemented as an operational amplifier (op-amp) OAP. The op-amp OAP includes an inverting input terminal (−), to which the feedback discharge control voltage V3D_F is input through an input resistance R, a non-inverting input terminal (+), to which the discharge control voltage V3D is input, and an output terminal OT which is connected to the inverting input terminal (−) through a feedback resistance Rf and outputs the compensated discharge control voltage V3D_M through an output node NO.

The op-amp OAP amplifies a difference between the input discharge control voltage V3D and the feedback discharge control voltage V3D_F based on an inverting amplification ratio (−Rf/R) determined depending on the input resistance R and the feedback resistance Rf and outputs the compensated discharge control voltage V3D_M.

Figure 15:
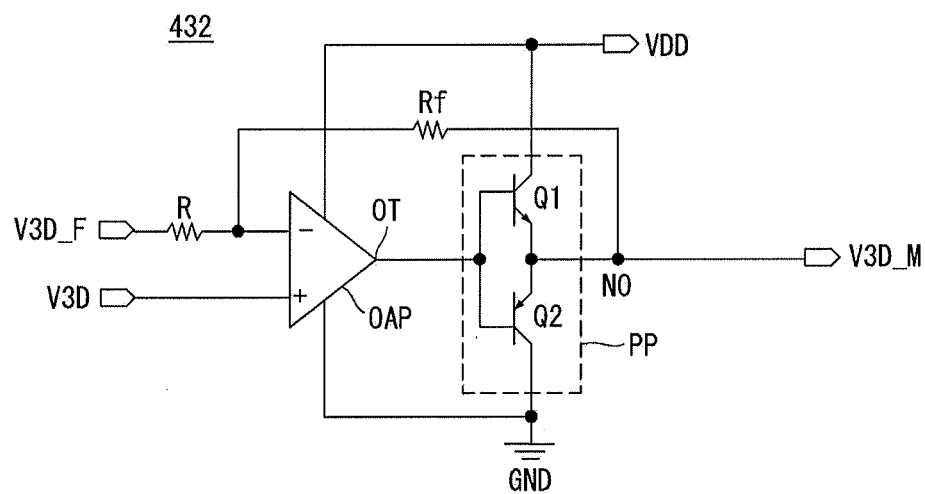
FIG. 15 illustrates another example of a control voltage compensator shown in FIG. 13.

FIG. 15 illustrates another example of the control voltage compensator 432 shown in FIG. 13.

As shown in FIG. 15, the control voltage compensator 432 may include an op-amp OAP and a push-pull amplifier PP.

Since a configuration and an operation of the op-amp OAP shown in FIG. 15 are substantially the same as the op-amp OAP shown in FIG. 14, a further description may be briefly made or may be entirely omitted.

The push-pull amplifier PP is connected between an output terminal OT of the op-amp OAP and an output node NO and increases a magnitude of the compensated discharge control voltage V3D_M.

The push-pull amplifier PP includes two emitter followers which are commonly controlled by a voltage applied to the output terminal OT of the op-amp OAP and are connected in series to each other between a high potential power voltage source VDD and a ground level voltage source GND. The push-pull amplifier PP includes an npn transistor Q1 and a pnp transistor Q2. The npn transistor Q1 is controlled by an input signal applied to the output terminal OT of the op-amp OAP, is connected between the high potential power voltage source VDD and the output node NO, and is turned on in a positive period of the input signal. The pnp transistor Q2 is controlled by an input signal applied to the output terminal OT of the op-amp OAP, is connected between the output node NO and the ground level voltage source GND, and is turned on in a negative period of the input signal.

Figure 16:
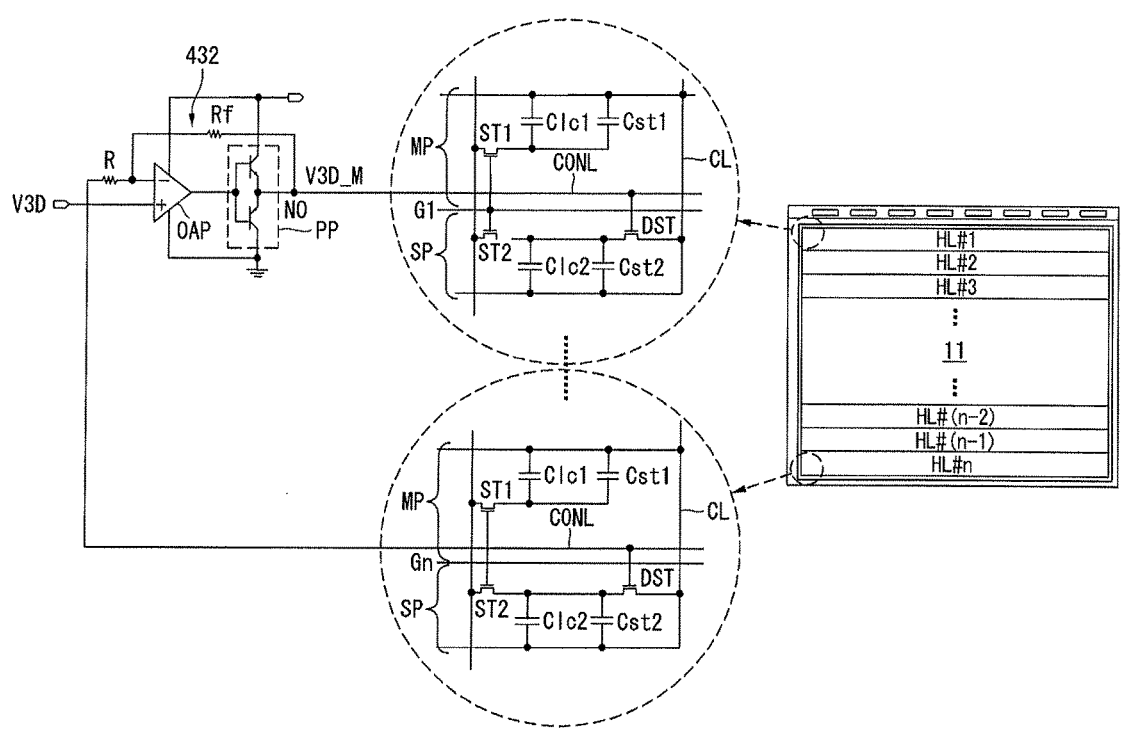
FIG. 16 illustrates a connection relation between a control voltage compensator and pixels of a display panel.

FIG. 16 illustrates a connection relation between the control voltage compensator 432 and pixels of the display panel 11. In FIG. 16, HL#1 to HL#n denote horizontal pixel lines each including the plurality of pixels.

As shown in FIG. 16, the output terminal OT of the control voltage compensator 432 outputting the compensated discharge control voltage V3D_M is connected to the discharge control line CONL using the discharge control line CONL connected to pixels of an uppermost horizontal pixel line HL#1 as an input position.

The inverting input terminal (−) of the control voltage compensator 432 (i.e., the op-amp OAP), to which the feedback discharge control voltage V3D_F is input, is connected to the discharge control line CONL using the discharge control line CONL connected to pixels of a lowermost horizontal pixel line HL#n as a feedback position.

As described above, the stereoscopic image display according to the embodiment of the present disclosure includes the auxiliary display units SP, each of which displays image data in the 2D mode and represents the black gray level in the 3D mode, in the display panel, thereby widening the vertical viewing angle of the 3D image without a reduction in the luminance of the 2D image. Further, the stereoscopic image display according to the embodiment of the present disclosure receives the discharge control voltage from the display panel and compensates for the discharge control voltage input to the display panel based on the discharge control voltage, so as to increase the completeness of the technology of the active black stripe. Hence, the stereoscopic image display according to the embodiment of the present disclosure can completely represent the black gray level through all the auxiliary display units of the entire screen in the 3D mode.

Although the invention has been described with reference to a number of illustrative embodiments thereof, it should be understood that other modifications and embodiments can be devised by those skilled in the art without departing from the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
   a display panel including data lines, gate lines crossing the data lines, a discharge control line, and a plurality of pixels, each of the plurality of pixels being divided into a main display unit and an auxiliary display unit;
   a data driving circuit configured to supply a data voltage of a two-dimensional plane (2D) image to the data lines in a 2D mode and supply a data voltage of a three-dimensional plane (3D) image to the data lines in a 3D mode;
   a gate driving circuit configured to sequentially supply a scan pulse, which swings between a gate low voltage and a gate high voltage, to the gate lines in the 2D mode and the 3D mode;
   a control voltage generator configured to generate a discharge control voltage that is substantially equal to the gate low voltage in an "on" duty cycle when in the 2D mode, and generate the discharge control voltage when in the 3D mode to be applied to the discharge control line only at a slight-on level in the "on" duty cycle, which the slight-on level is higher than the gate low voltage and is lower than the gate high voltage, and periodically reduce the discharge control voltage to a level of the gate low voltage in the 3D mode, wherein the discharge control voltage for both the 2D mode and the 3D mode in a remaining "off" cycle is at the level of the gate low voltage at predetermined time intervals, the slight-on level being a peak voltage of a waveform applied to the discharge control line only when in the 3D mode; and
   a control voltage compensator configured to receive the discharge control voltage from the control voltage generator, amplify a feedback discharge control voltage supplied from a first part of the display panel based on the received discharge control voltage, and apply the amplified feedback discharge control voltage, as a compensated discharge control voltage, to a second part opposite the first part of the display panel.

2. The stereoscopic image display of claim 1, wherein a line resistance of the discharge control line in the first part of the display panel is greater than a line resistance of the discharge control line in the second part of the display panel.

3. The stereoscopic image display of claim 1, wherein a lowermost horizontal pixel line of the display panel is selected as the first part of the display panel, and an uppermost horizontal pixel line of the display panel is selected as the second part of the display panel.

4. The stereoscopic image display of claim 1, wherein a slight-on level of the compensated discharge control voltage is higher than a slight-on level of the received discharge control voltage.

5. The stereoscopic image display of claim 1, wherein the control voltage compensator includes an operational amplifier, wherein the operational amplifier includes:
   an inverting input terminal, to which the feedback discharge control voltage is input through an input resistance;
   a non-inverting input terminal, to which the discharge control voltage is input; and
   an output terminal which is connected to the inverting input terminal through a feedback resistance and outputs the compensated discharge control voltage to an output node connected to the second part of the display panel.

6. The stereoscopic image display of claim 5, wherein the control voltage compensator further includes a push-pull amplifier which is connected between the output terminal of the operational amplifier and the output node and increases a magnitude of the compensated discharge control voltage.

7. The stereoscopic image display of claim 6, wherein the push-pull amplifier includes two emitter followers which are commonly controlled by a voltage applied to the output terminal of the operational amplifier and are connected in series to each other between a high potential power voltage source and a ground level voltage source.

8. The stereoscopic image display of claim 1, wherein the main display unit includes a first pixel electrode, which is connected to the data line through a first switch, and a first common electrode which is opposite to the first pixel electrode and is connected to a common line,
   wherein the auxiliary display unit includes a second pixel electrode, which is connected to the data line through a second switch driven at the same timing as the first switch, a second common electrode which is opposite to the second pixel electrode and is connected to the common line, and a discharge control switch which connects the second pixel electrode to the common line in response to the compensated discharge control voltage.

9. The stereoscopic image display of claim 1, wherein the control voltage generator generates the discharge control voltage to be applied to the discharge control line at the level of the gate low voltage in the 2D mode.

* * * * *